United States Patent Office 2,999,075
Patented Sept. 5, 1961

2,999,075
PROCESS FOR PRODUCING NICKEL AND COBALT HYDROGENATION CATALYSTS
Roy L. Pruett, Tonawanda, N.Y., assignor to Union Carbide Corporation, a corporation of New York
No Drawing. Filed May 26, 1955, Ser. No. 511,429
5 Claims. (Cl. 252—472)

This invention relates to nickel and cobalt catalysts, to production of nickel and cobalt in improved catalytically active state and to the utiilzation of such catalytic nickel and cobalt for hydrogenation of hydrogenatable organic compounds. More particularly, the invention relates to production of nickel and cobalt in improved catalytically active state by hydrogenation of organo-nickel and organo-cobalt compounds. The invention includes correlated improvements and discoveries whereby such catalytically effective nickel and cobalt resulting from hydrogeneration of such organo-nickel and organo-cobalt compounds may be utilized in hydrogenation of hydrogenatable organic compounds.

An object of the invention is the provision of improved catalystic nickel and cobalt adapted for employment as catalyst in reactions of organic compounds, particularly hydrogenation of hydrogenatable organic materials. A further object is the provision of a method for producing such metals in improved catalytically active state. A still further object is production of a hydrogenation catalyst in the presence of an organic compound to be hydrogenated with aid of such catalyst and carrying out such hydrogenation.

Other objects of the invention will in part be obvious and will in part appear hereinafter.

In the practice of the invention, catalytically active finely divided nickel and cobalt are produced by hydrogenative decomposition of organo-nickel and of organo-cobalt compounds. Organo-nickel and organo-cobalt compounds particularly adapted for employment in the production of the respective catalytic metals in finely divided form by hydrogenative decomposition are specifically bis(cyclopentadienyl and aliphatic hydrocarbon substituted cyclopentadienyl) nickels and cobalts, the organo-nickel and organo-cobalt compounds having unsubstituted cyclopentadienyl radicals or alkylcyclopentadienyl radicals (e.g. methyl and ethyl cyclopentadienyl radicals) as the organic moiety being preferred, although organo-metallic compounds containing unsaturated aliphatic hydrocarbon substituted cyclopentadienyl radicals (e.g. allylcyclopentadienyl) as the organic moiety may be employed. Accordingly, the expression "bis(cyclopentadienyl) derivatives" as used herein in the specification and the claims will be understood to include organo-nickel and organo-cobalt compounds having aliphatic hydrocarbon substituted cyclopentadientyl radicals and the unsubstituted cyclopentadienyl radical as their organic moiety. It will be understod also that mixtures of bis(cyclopentadienyl) derivatives of nickel and cobalt or mixtures of nickel and cobalt derived from them may be employed.

Production of catalytic nickel and cobalt by hydrogenative decomposition according to this invention may be carried out by hydrogenation of a bis(cyclopentadienyl) derivative of nickel or cobalt in liquid or vapor phase. In the case of a liquid phase hydrogenation, the organo-metallic compound is hydrogenated in an organic liquid. Such hydrogenations may be carried out under pressure, the liquid phase hydrogenation being desirably carried out under pressure. The use of pressure in such liquid phase hydrogenation appears to facilitate and accelerate the hydrogenation reaction and in such hydrogenation pressures of about 1000 p.s.i.g. or more are preferred. For liquid phase operation temperatures from about 100° C. to about 250° C. are preferred but higher temperatures may be employed. Further, the organic liquid is preferably a solvent for the bis(cyclopentadienyl) metal compound and may be hydrogenatable.

Vapor phase hydrogenative decomposition may also be carried out to produce catalytic nickel and cobalt. It may be effected by contacting the bis(cyclopentadienyl) derivative with an atmosphere containing hydrogen and preferably at a temperature from about 100° C. to about 400° C.

The liquid phase hydrogenative decomposition may be carried out by dissolving the bis(cyclopentadienyl) derivative of the metal in a hydrogenatable organic liquid and continuing the hydrogenation. There is thus attained a combined production of hydrogenation catalyst and hydrogenation of the solvent organic liquid phase in a single continued operation.

Whichever method be employed for hydrogenative decomposition of the organo-metallic compound, the resulting catalyst is nickel or cobalt derived by hydrogenative decomposition of a bis(cyclopentadienyl) derivative of the metal.

The temperatures at which hydrogenative decomposition of bis(cyclopentadienyl) derivatives of nickel and cobalt take place lie between about 100° C. to 400° C. Generally, in the liquid phase hydrogenative decomposition, temperatures of about 250° C. need not be exceeded. In the liquid phase hydrogenative decomposition under hydrogen pressure the course of reaction may be followed by noting the pressure changes, decreases in pressure being indicative of an uptake of hydrogen in the course of hydrogenative decomposition. In general, it is preferred that the temperature at which reaction is indicated be not greatly exceeded. In some instances, and particularly as respects bis(cyclopentadienyl) derivatives of cobalt, temperatures of about 150°–200° C. may be required for initiation of the hydrogenative decomposition reaction. When nickel and cobalt prepared according to this invention are utilized as a catalyst in hydrogenation or other reactions, the conditions normally encountered in such reactions in the presence of a catalyst may be employed. For hydrogenations, 1000–2500 p.s.i.g. hydrogen pressure in temperatures of 100°–250° C. are common.

Bis(cyclopentadienyl) derivatives of nickel and cobalt may thus advantageously be employed as a source of catalyst for hydrogenation reactions. Moreover, the finely divided catalytic metal produced according to this invention shows surprising storage stability. It may be stored for protracted periods after its manufacture without significant loss of catalytic activity. Thus, catalysts of this invention are generally adapted for convenient general employment in reactions requiring catalytic nickel or cobalt.

Hydrogenative decomposition in liquid phase of bis-(cyclopentadienyl)nickel may be taken as illustrative of catalyst production according to this invention. When this compound, dissolved in an organic liquid, is treated with hydrogen at about 1500 p.s.i.g. and 110° C., it reacts to form cyclopentane and a finely divided form of nickel.

The wide applicability of catalysts of this invention may be illustrated by the following hydrogenation reactions to which nickel catalyst derived by hydrogenative decomposition of organo-nickel compounds according to this invention have been applied.

(1) $C_6H_5CH_3 + 3H_2 \rightarrow C_6H_{11}CH_3$
   Toluene     Methylcyclohexane (2) $C_6H_5CHO + H_2 \rightarrow C_6H_5CH_2OH$
   Benzaldehyde     Benzyl alcohol (3) $C_6H_5CH_2OH + H_2 \rightarrow C_6H_5CH_3 + H_2O$
   Benzyl alcohol     Toluene (4) $CH_3CH_2COC_6H_5 + H_2 \rightarrow CH_3CH_2CH(OH)C_6H_5$
   Propiophenone     alpha-phenylpropanol (5) $C_6H_5OH + 3H_2 \rightarrow C_6H_{11}OH$
   Phenol     Cyclohexanol (6) $C_6H_{10} + H_2 \rightarrow C_6H_{12}$
   Cyclohexene     Cyclohexane (7) $CH_3COCH_3 + H_2 \rightarrow (CH_3)_2CHOH$
   Acetone     Isopropyl alcohol (8) $HOC_6H_4NO_2 + 3H_2 \rightarrow HOC_6H_4NH_2 + 2H_2O$
   para-nitrophenol     para-aminophenol (9) $(CH_3)_2C_4H_2N_2 + 3H_2 \rightarrow (CH_3)_2C_4H_8N_2$
   Dimethylpyrazine     Dimethylpiperazine Broad applicability of the catalyst in hydrogenation reactions is apparent. Equations 2 and 3, above, illustrate selective hydrogenation with recovery of intermediate hydrogenated compounds. The conditions of temperature somewhat affect the degree of hydrogenation also. Temperatures between 100° and 150° C. facilitate selective minimum hydrogenation of hydrogenatable aliphatic and alicyclic materials and of hydrogenatable substituents on aromatic nuclei, while temperatures from 150° to 250° C. facilitate hydrogenation of aromatic nuclei.

The metallic catalyst may be utilized in several ways. It may be formed by first hydrogenating the bis(cyclopentadienyl) derivatives of nickel or cobalt in solution in a solvent such as ethanol or n-heptane. The metal may then be recovered from the organic liquid and stored for future use or the material to be hydrogenated may be added to the suspension of catalyst and hydrogenation continued. Also, the organo-nickel or -cobalt derivative, the solvent, and the material to be catalytically hydrogenated may be mixed into a homogeneous solution and this solution hydrogenated.

Alternatively, where the material to be hydrogenated is a solvent for the organo-nickel or -cobalt compound, it may serve as the sole solvent and hydrogenation may be carried out to effect hydrogenative decomposition and hydrogenation progressively. Catalyst produced by vapor phase hydrogenative decomposition may be stored for future use as a catalyst or may be used immediately.

As illustrative embodiments of a manner in which the invention may be practiced, the following examples are presented in which utilization is made of bis(cyclopentadienyl) derivatives of nickel and bis(cyclopentadienyl) derivatives of cobalt as catalyst sources.

EXAMPLE I

Hydrogenation of cyclohexene $$C_6H_{10} + H_2 \rightarrow C_6H_{12}$$

Absolute ethanol (100 ml.), cyclohexene (20 ml.), and 1 g. Ni($C_5H_5$)$_2$ were mixed. Part of the Ni($C_5H_5$)$_2$ dissolved, and some white precipitate settled out. The mixture was placed in a rocking steel pressure vessel, pressurized with hydrogen at 1180 p.s.i.g., and heated. At 1400 p.s.i.g. and 110–125° C. there was a drop in pressure to 1110 p.s.i.g. within 10 min., then it rose to 1300 p.s.i.g. in 15 min., and remained constant for 3 hrs. The reactor was cooled to room temperature and discharged. The product contained colloidal black material. No green color was observed, indicating the disappearance of Ni($C_5H_5$)$_2$, and the black solid which was formed was not pyrophoric. The final pressure of the vessel at 25° C. was 790 p.s.i.g. The reduction in pressure of 390 p.s.i.g. during reaction is substantially the theoretical pressure drop for hydrogenation of cyclohexene to cyclohexane.

EXAMPLE II

Hydrogenation of acetone

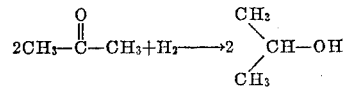

One gram Ni($C_5H_5$)$_2$ was dissolved in 110 ml. n-heptane, and acetone (0.20 mole—15 ml.) added. A small amount of red-brown residue settled out leaving a green solution. The reaction mass was placed in a steel pressure vessel, the free gas space of which was purged two times with 2200 p.s.i.g. argon and bled to atmospheric pressure. Hydrogen under a pressure of 1110 p.s.i.g. at 25° C. was then applied and the reaction vessel and contents were heated at a rate of 10–12° C. rise per 5 min. until the temperature reached 150° C. Hydrogenation took place in two hours at 150° C. The reduction in pressure during the hydrogenation of 370 p.s.i.g. conforms with the theoretical pressure drop of 350 p.s.i.g. for hydrogenation of acetone to isopropyl alcohol. The product was a clear, colorless liquid with an alcohol odor. A black residue which settled readily was also present in the product.

EXAMPLE III

Hydrogenation of propiophenone $$CH_3CH_2COC_6H_5 + H_2 \rightarrow CH_3CH_2CH(OH)C_6H_5$$

93 ml. n-heptane, 26.8 g. propiophenone, and 1 g. Ni($C_5H_5$)$_2$ were added to a rocking steel autoclave. The vessel was pressurized under 1130 p.s.i.g. hydrogen and heated with rocking at a rate of 2° C. rise/min. A change in the slope of the pressure vs. time curve occurred at about 1370 p.s.i.g. and 110° C. At 150° C. the pressure fell off slowly. A constant pressure of 1100 p.s.i.g. remained after 17 hrs. A pressure of 740 p.s.i.g. remained in the vessel at room temperature. The pressure drop of 390 p.s.i.g. showed complete hydrogenation to alpha-phenylpropanol, the theoretical being 400 p.s.i.g.

EXAMPLE IV

Hydrogenation of benzaldehyde $C_6H_5CHO + H_2 \rightarrow C_6H_5CH_2OH$     (1)
$C_6H_5CH_2OH + H_2 \rightarrow C_6H_5CH_3 + H_2O$     (2)

100 ml. n-heptane, 21.2 g. benzaldehyde, and 4 g. Ni($C_5H_5$)$_2$ were placed in a 300 ml. volume rocking steel autoclave and pressurized under 1415 p.s.i.g. hydrogen. The contents of the autoclave were heated at a rise of 2° C./min. At 1685 p.s.i.g. and 105° C. after 35–40 min. there was a sharp pressure drop. Within 5–10 min. the pressure dropped to 1200 p.s.i.g. This drop is substantially theoretical for hydrogenation of the aldehyde group to the alcohol, according to Equation 1 above (350–400 p.s.i.g. pressure drop) plus hydrogenation of the cyclopentadienyl group of the catalyst (100 p.s.i.g.). A slower pressure drop then occurred, and in 6 hrs. the pressure dropped from 1200 p.s.i.g. to 800 p.s.i.g. In 13 more hours the pressure dropped only to 750 p.s.i.g. This pressure drop is substantially theoretical for hydrogenation of benzyl alcohol to toluene according to Equation 2 above.

The product was a colorless liquid of two layers. The bottom layer appeared to be water. A black, magnetic solid settled rapidly. A toluene odor was present. The top layer was decanted and fractionally distilled through a laboratory distillation column. Most of the product distilled at a head temperature of 98–99° C., which did not rise above 101–106° C. (B.P. toluene 110.6° C., n-heptane 98.4° C.). The pot residue and the final cuts had strong toluene odor. No evidence of benzaldehyde in the product was obtained.

EXAMPLE V

Hydrogenation of phenol $$C_6H_5OH + 3H_2 \rightarrow C_6H_{11}OH$$

100 ml. ethanol, 4 g. $Ni(C_5H_5)_2$ and 18.8 g. phenol were placed in a steel 300 ml. capacity pressure vessel, which was pressurized under 1700 p.s.i.g. hydrogen and heated at a rate of 2° C. rise/min. At a temperature of about 100° C. there was a sharp pressure drop from 2000 to 1910 p.s.i.g. At 200° C. the pressure dropped from 2500 to 2300 p.s.i.g. in 40 min. The temperature controller was then set at 250° C. The pressure climbed slowly to 2425 p.s.i.g. in 1 hr. At or near 250° C. the pressure dropped slowly from 2425 to 1600 p.s.i.g. in 15 hrs., then held nearly constant for 3 hrs. The reactor was then cooled to room temperature and the contents discharged. The product solution was distilled and a product obtained having a boiling point of 71–81° C. at 20 mm. of mercury, and a refractive index of 1.4641. Cyclohexanol has a refractive index of 1.4650, and its boiling point at 20 mm. is about 70° C.

EXAMPLE VI

Hydrogenation of toluene $$C_6H_5CH_3 + 3H_2 \rightarrow C_6H_{11}CH_3$$

100 ml. n-heptane, 18.4 g. toluene, and 4 g. $Ni(C_5H_5)_2$ were pressurized under 1050 p.s.i.g. hydrogen in a rocking steel autoclave. Heat was applied to give a rise of 2° C./min. At 100–110° C. the pressure dropped sharply from 1210 to 1100 p.s.i.g. The pressure then climbed slowly to 1170 p.s.i.g., and at 150° C. (1170 p.s.i.g.) the pressure began to drop at rate of slightly more than 100 p.s.i.g./hr. to 1050 p.s.i.g. At this point additional hydrogen was introduced to increase the pressure to 1550 p.s.i.g. The solution was heated at a rate of rise of about 1° C./min. with no pressure increase being noted. The pressure began to decrease slowly, then sharply at 240° C. from 1500 p.s.i.g. to 1100 p.s.i.g. in 1 hr., then rose to 1215 p.s.i.g. in 2 hrs. For the next 13 hrs. the pressure remained essentially constant at 1205–1215 p.s.i.g. The product was a colorless liquid with some black solid also present. Total hydrogenation time was 6 hrs. Pressure drop indicates hydrogenation.

EXAMPLE VII

Hydrogenation of para-nitriphenol $$HOC_6H_4NO_2 + 3H_2 \rightarrow HOC_6H_4NH_2 + 2H_2O$$

100 ml. ethanol and 4 g. $Ni(C_5H_5)_2$ were placed in a steel pressure vessel. Hydrogen at 1590 p.s.i.g. was introduced, and the vessel was heated to hydrogenate the $Ni(C_5H_5)_2$. Hydrogenation occurred at about 100° C., and the vessel was cooled. Para-nitrophenol (27.8 g.) was then added to the vessel and the hydrogen pressure increased to 1550 p.s.i.g. Heat was applied to give a temperature rise of 2° C./min. At 110° C. the pressure dropped from 1900 p.s.i.g. to 1000 p.s.i.g. in 15 min. In 25 more minutes the pressure dropped to 890 p.s.i.g. In 11 more hours the pressure dropped to 820 p.s.i.g. The product was a blue liquor containing a large amount of well-formed, gray-white crystals. These crystals—para-aminophenol—had a melting point of 183–185° C. with decomposition.

EXAMPLE VIII

Hydrogenation of cyclohexene $$C_6H_{10} + H_2 \rightarrow C_6H_{12}$$

n-Heptane (100 ml.) was added to 4 g. $(C_5H_5)_2Co$ and 16.4 g. cyclohexene was added. The reaction mass was placed in a steel pressure vessel and pressurized to 1510 p.s.i.g. with hydrogen. The reactor was heated at a rate of 2° C. rise/min. At 175° C. there was a sharp pressure drop within 5 min. from 2190 p.s.i.g. to 1630 p.s.i.g. The pressure then rose slightly to 1680 p.s.i.g. and held constant at this point for 1.5 hrs. The reactor was then cooled to room temperature and discharged. Pressure drop during reaction showed that hydrogenation had occurred.

EXAMPLE IX

Hydrogenation of benzaldehyde $$C_6H_5CHO + 2H_2 \rightarrow C_6H_5CH_3 + H_2O$$

A mixture of 0.2 mole (21.2 g.) benzaldehyde, 100 ml. n-heptane and 4.6 g. $(CH_3C_5H_4)_2Ni$ was placed in a 300 ml. steel pressure vessel and pressurized under 1500 p.s.i.g. hydrogen. The reaction mixture was then heated at a temperature rise rate of about 2° C./min. At about 120° C. the pressure dropped from 1870 to 1550 p.s.i.g. in 20 min., and then from 1550 to 1410 p.s.i.g. in 30 min. The pressure slowly dropped from 1410 to 1000 p.s.i.g. in 8.5 hrs. The maximum temperature was 150° C. Pressure remained constant in 1000 p.s.i.g. overnight while the temperature was maintained at 150° C. The overall pressure drop of 870 p.s.i.g. evidenced complete hydrogenation of benzaldehyde to toluene. The two-step pressure drop during hydrogenation indicated formation first of $C_6H_5CH_2OH$ followed by formation of $C_6H_5CH_3$ as in Example IV.

EXAMPLE X

Hydrogenation of dimethylpyrazine $$(CH_3)_2C_4H_2N_2 + 3H_2 \rightarrow (CH_3)_2C_4H_8N_2$$

Bis(cyclopentadienyl)nickel was packed into a jacketed tube. A mixture of hydrogen and nitrogen was passed through the tube while the temperature was raised gradually. The temperature was held at 160° C. until heat evolution ceased. Then the temperature was raised to 375° C. and held for 6 hours after which it was lowered to 155° C. At this temperature, dimethylpyrazine was added to the gas stream and trans-2,5-dimethylpiperazine was obtained.

Nickel and cobalt in finely divided form have been utilized previously as hydrogenation catalysts; however, the catalysts previously used, and more particularly nickel—for example, Raney nickel—possess certain disadvantages inasmuch as they must be prepared just prior to use due to their unstable character, and are difficult to mix with the reactant materials to form a homogeneous solution. Further, they are pyrophoric when exposed to air. In contradistinction thereto, the catalytic material of the present invention may be mixed into a homogeneous solution with the reactant material; it is stable, hence has good shelf life; it requires no modification before use, it may be prepared in situ as needed, and the resulting finely divided metal catalyst is not pyrophoric and may be recovered and readily stored for future use.

The bis(cyclopentadienyl) compounds, as bis(cyclopentadienyl)nickel and bis(cyclopentadienyl)cobalt, may be produced by procedures described in the following copending applications of Maurice A. Lynch, Jr. and John C. Brantley, Serial No. 381,970, filed September 23, 1953; of John C. Brantley and Edward L. Morehouse, Serial No. 381,967, filed September 23, 1953, now abanjoined; and of John C. Brantley, Serial No. 363,402, filed June 22, 1953.

Having described my invention, what I claim as new and desire to secure by Letters Patent is:

1. A process for producing a non-pyrophoric and storage-stable metal catalyst selected from the group consisting of nickel and cobalt in finely divided catalytically active form which comprises decomposing a member of the group consisting of organo-nickel and organo-cobalt compounds, wherein the organo moiety is a radical selected from the group consisting of bis(cyclopentadienyl) and bis(aliphatic-substituted cyclopentadienyl), by the action of hydrogen at a temperature from about 100° C. to about 400° C. until said decomposition is substantially complete as indicated by cessation of uptake of hydrogen.

2. A process as defined in claim 1 in which the organo moiety is bis(alkylcyclopentadienyl).

3. A process as defined in claim 1 in which the organo moiety is bis(methylcyclopentadienyl).

4. A process for producing a non-pyrophoric and storage-stable metal catalyst selected from the group consisting of nickel and cobalt in finely divided catalytically active form which comprises decomposing a member of the group consisting of organo-nickel and organo-cobalt compounds, wherein the organo moiety is a radical selected from the group consisting of bis(cyclopentadienyl) and bis(aliphatic-substituted cyclopentadienyl), in an organic liquid medium by the action of hydrogen under pressure at a temperature from about 100° C. to about 250° C. until said decomposition is substantially complete as indicated by cessation of uptake of hydrogen.

5. A process for producing a non-pyrophoric and storage-stable metal catalyst selected from the group consisting of nickel and cobalt in finely divided catalytically active form which comprises decomposing a member of the group consisting of organo-nickel and organo-cobalt compounds, wherein the organo moiety is a radical selected from the group consisting of bis(cyclopentadienyl) and bis(aliphatic-substituted cyclopentadienyl) in a gaseous atmosphere consisting essentially of hydrogen at a temperature from about 100° C. to about 400° C. until said decomposition is substantially complete as indicated by cessation of uptake of hydrogen.

References Cited in the file of this patent

UNITED STATES PATENTS

| | | |
|---|---|---|
| 1,251,202 | Ellis | Dec. 25, 1917 |
| 1,329,322 | Ellis | Jan. 27, 1920 |
| 1,540,448 | Wilson | June 2, 1925 |
| 1,907,710 | Bass | May 9, 1933 |
| 2,132,613 | Francon | Oct. 11, 1938 |
| 2,340,021 | Sabia | Jan. 25, 1944 |
| 2,414,552 | Pfann et al. | Jan. 21, 1947 |
| 2,442,473 | Sayward et al. | June 1, 1948 |
| 2,474,782 | Dixon | June 28, 1949 |
| 2,599,978 | Davis et al. | June 10, 1952 |
| 2,680,756 | Pauson | June 8, 1954 |
| 2,680,757 | Himel | June 8, 1954 |
| 2,680,758 | Thomas | June 8, 1954 |
| 2,747,986 | Gwynn et al. | May 29, 1956 |

OTHER REFERENCES

Ipatieff: "Catalytic Reactions" (1936), page 350 ff.